June 23, 1970   J. R. MATTOX ET AL   3,516,121
TIRE RETREADING MOLD APPARATUS HAVING LOCKING MEANS
Filed June 13, 1968   2 Sheets-Sheet 1

INVENTORS
JOHN R. MATTOX
THOMAS W. MATTOX

BY

ATTORNEY

INVENTORS
JOHN R. MATTOX
THOMAS W. MATTOX

BY *B.P. Fishburn, Jr.*

ATTORNEY

United States Patent Office 3,516,121
Patented June 23, 1970

3,516,121
TIRE RETREADING MOLD APPARATUS HAVING LOCKING MEANS
John R. Mattox, Rte. 3, Box 208–A 28210, and Thomas W. Mattox, 7205 Marley Circle 28214, both of Charlotte, N.C.
Filed June 13, 1968, Ser. No. 736,783
Int. Cl. B29h 5/04
U.S. Cl. 18—18                                    11 Claims

ABSTRACT OF THE DISCLOSURE

A tire retreading mold structure in which a lower base or stand supports the full circle mold components and the latter are clamped and secured by an overhead clamping unit which is shiftable between inactive and active positions. To eliminate friction and wear on vital parts and to reduce manual labor, a power-operated low friction device is activated to force the clamping unit against the mold components with great force and thus eliminating the necessity for locking by the manual operation of a heavy clamping nut.

Cross reference to related patent

The invention herein is particularly adaptable for use upon the retreading apparatus for tires disclosed in U.S. Pat. 3,240,653, issued Mar. 15, 1966, to J. R. Mattox et al., and constitutes an improvement on the apparatus of that patent.

Background of the invention

As evidenced by the above-identified Mattox et al. patent, tire retreading molds are known embodying a floor stand or base which supports a full circle retreading mold horizontally for receiving the carcass of a tire to be retreaded. The structure may also include power-operated, relatively movable tire bead engaging rings and an overhead hinged matrix clamping unit which is movable by a power actuator to and from active and inactive positions. When in the active clamping position with the matrix, the final tightening of the clamp structure in the conventional prior art involves the manual turning of a heavy clamping nut with relation to a large clamping shaft which extends vertically and has interlocking engagement at its lower end with a coupling device carried by the floor stand. This conventional procedure is laborious and awkward and results in excessive friction with resulting heavy wear on parts. Additionally, the clamping of the mold may not be uniform and may not be sufficient in some cases to properly position the mold components and tire while the tire is under curing pressure in the retreading process.

The invention cures the above deficiencies of the prior art through the provision in a retreading apparatus of the type shown in the mentioned Mattox et al. patent of a quick-acting, power-operated, low friction wedging unit which is activated after a simple preliminary positioning of the overhead clamping unit on the mold components to complete the clamping or locking of the apparatus in a very secure and always uniform manner and without manual labor.

Summary of the invention

The invention apparatus comprises a stand or base for a full circle retreading mold which rests thereon. An overhead clamping unit including a clamping ring is mounted bodily on a pivoted arm or lever structure adapted to be raised and lowered by a power cylinder having suitable controls. The clamping unit includes a center screw-threaded clamping shaft whose lower end is releasably engageable with a coupling element on the stand structure below the clamping unit. The clamping shaft carries a nut equipped with handle means to provide a preliminary setting of the clamping unit prior to final locking.

The clamping unit is equipped with a roller wedge assembly and power cylinder means to shift the wedge in opposite directions. The wedge cooperates with top and bottom pressure plates so that when the wedge is moved in one direction, the clamping ring will be forced into firm holding engagement with the matrix components, without the need for further manual turning of the clamping nut. When the retreading process is completed, reverse movement of the wedge will quickly unlock the matrix clamping unit for return movement to its open or inactive position allowing removal of the tire from the mold apparatus.

Description of the preferred embodiment

Figure 1:
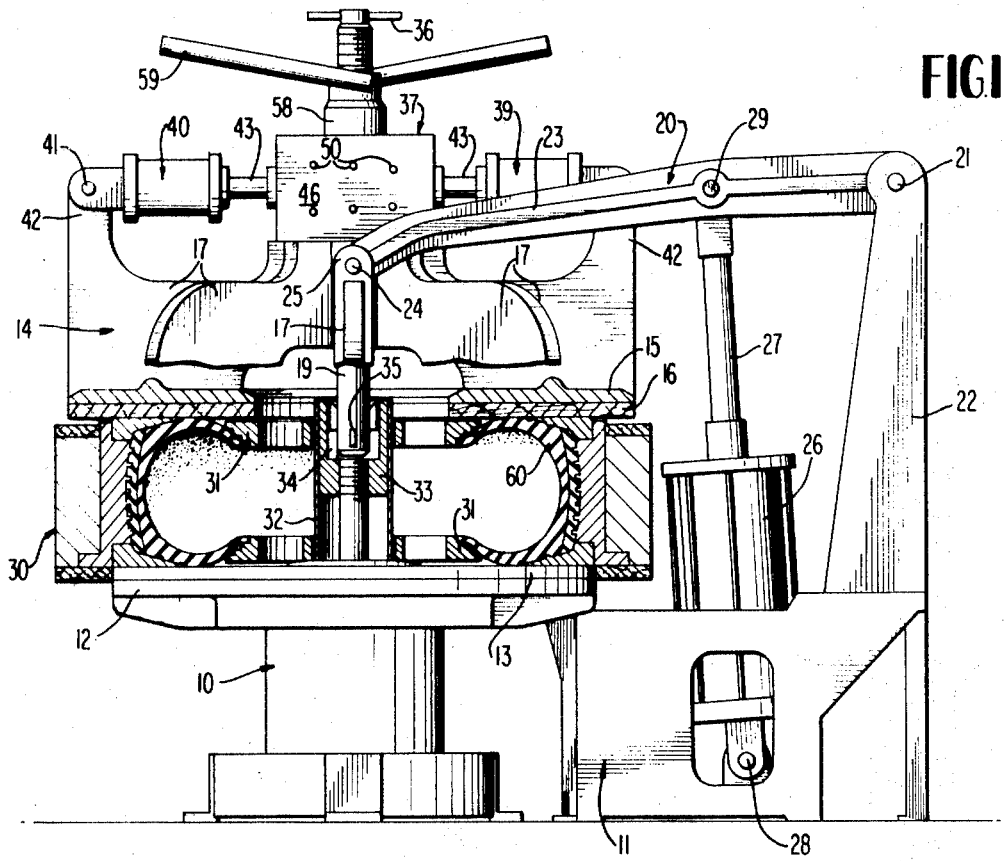
FIG. 1 is a side elevation, partly in section and partly broken away, showing a retreading mold apparatus embodying the invention.
Figure 2:
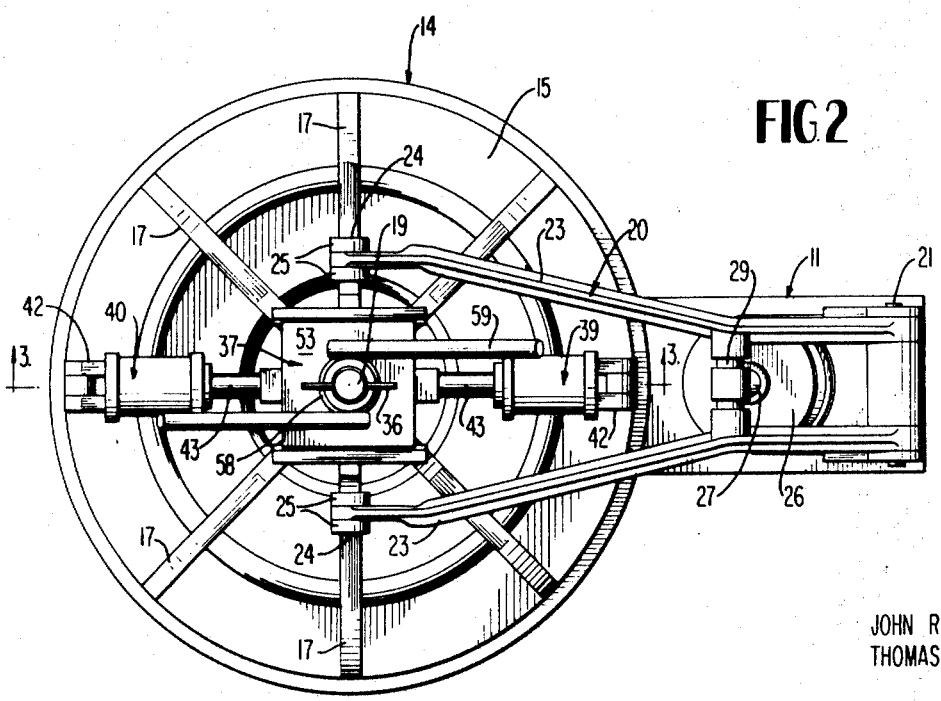
FIG. 2 is a plan view thereof.

Referring to the drawings in detail, wherein like numerals designate like parts throughout the same, the numeral 10 designates a floor-mounted stand or base for the apparatus having a side frame extension 11 and including a horizontal lower matrix clamping plate 12 preferably equipped with a lower matrix insulating ring 13.

Above the base 10 in opposed relation thereto is a matrix clamping unit or head 14 having a clamping ring 15 as an integral part thereof, the latter preferably carrying an upper matrix insulating ring 16 as shown in FIG. 1. The clamping unit 14 has circumferentially spaced web plates 17 extending above the ring 15 and formed integral therewith and these web plates 17 are radial and their inner ends are joined to a vertical tubular hub 18 whose bore receives a sturdy vertical clamping shaft 19 slidably.

The entire clamping unit 14 is carried on a vertically swingable arm structure or lever 20 whose outer end is pivoted at 21 to a sturdy upright extension 22 of frame extension 11 which is mounted to the floor. The arm structure 20 includes two diverging arms 23 whose inner ends extend over the center of the apparatus and are pivoted as at 24 to apertured lugs 25 formed integrally upon opposing web plates 17 of the clamping unit.

A power cylinder 26 having an extensible and retractable piston rod 27 is disposed between the upright 22 and the mold structure, with the lower end of the cylinder pivoted at 28 to frame extension 11 and the top of the piston rod pivoted at 29 to the arm structure 20. By the use of suitable controls disclosed in the mentioned Mattox et al. Pat. 3,240,653, the cylinder 26 is operated to raise and lower the arm structure 20 and consequently the entire upper clamping unit 14.

The retreading matrix assembly in its entirety is shown at 30 and this may be the identical mold matrix disclosed in detail in said Mattox et al. patent and the construction need not be described in full detail herein. The matrix 30 as shown in FIG. 1 rests upon the clamping plate 12 and insulating ring 13 of stand 10. The top of the matrix is engaged by the clamping ring 15 and upper insulating ring 16, as shown. Partially shown in FIG. 1 is the tire bead engaging ring means 31 fully disclosed in said Mattox et al. patent and also a center core tube 32 extending from the stand 10 and containing in its upper end a coupling block 33 having a bayonet locking slot 34, also fully disclosed in said prior patent.

The clamping shaft 19, which is freely turnable in the hub 18, carries keys 35 adjacent its lower end which interlock with the slot 34 of coupling block 33 precisely as set forth in said patent. The top of the shaft 19 carries a handle 36 which is used to manipulate the keys 35 into coupling engagement with the block 33. All of the above construction is substantially as disclosed in the Mattox et al. Pat. 3,240,653 and in view of such disclosure it is believed to be unnecessary to describe in further detail the general construction of the tire retreading mold apparatus in the present application.

Continuing to refer to the drawings, the apparatus further embodies a quick-acting power-operated locking or clamping device shown in its entirety at 37 and constituting the essence of the present invention. This device includes a horizontally shiftable roller wedge assembly 38 to be described in full detail and a pair of opposing cylinder-piston units 39 and 40 on opposite sides of the wedge device to operate the same. The cylinder-piston units 39 and 40 are horizontally disposed and have their outer ends secured at 41 to extensions 42 of an opposing pair of the radial web plates 17 of clamping unit 14. Piston rods 43 of units 39 and 40 are connected by cross pins 44 to roller wedge body plates 45, disposed inwardly of side plates 46 in spaced opposed relation, FIG. 5.

Figure 3:
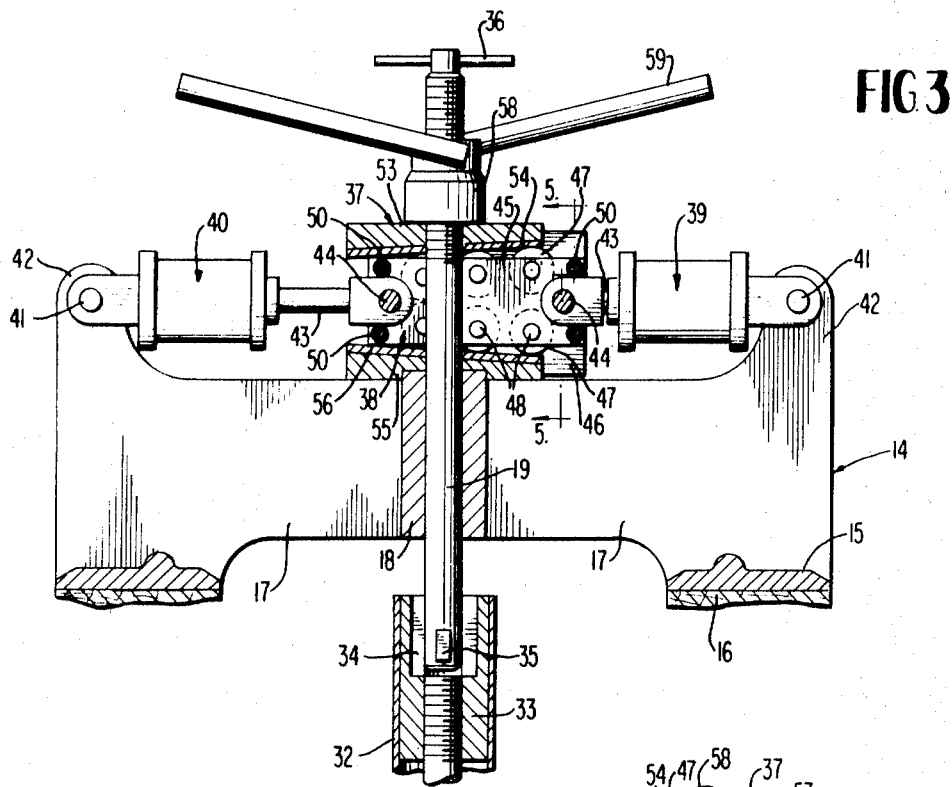
FIG. 3 is an enlarged fragmentary vertical section taken on line 3—3 of FIG. 2.
Figure 4:
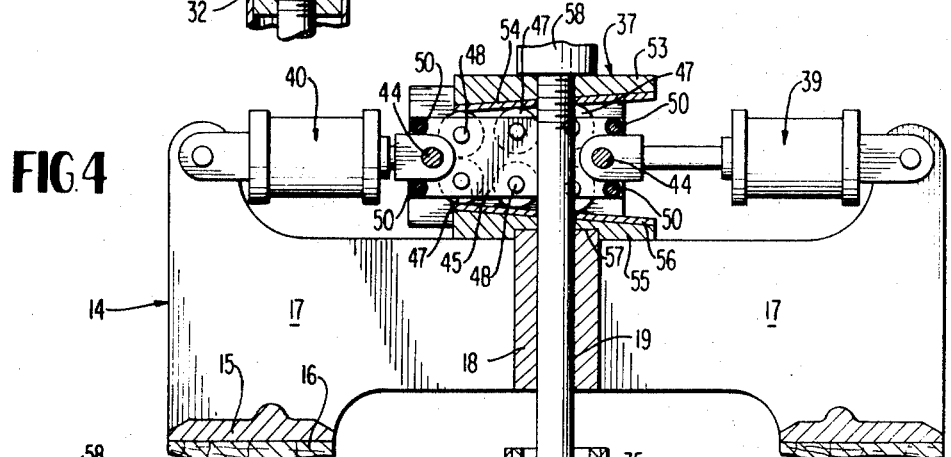
FIG. 4 is an additional cross sectional view, similar to FIG. 3, showing the locking roller wedge device in the activated position.
Figure 5:
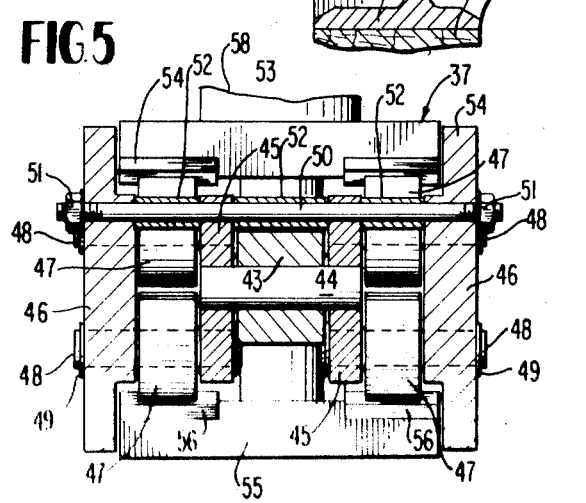
FIG. 5 is an enlarged fragmentary vertical section taken on line 5—5 of FIG. 3.

The clamping device 37 further comprises hard surfaced rollers 47, preferably six in number, as shown, journaled on axles 48 secured within openings in the plates 45 and 46 and retained therein by snap rings 49 or the like. The rollers 47 are thus disposed between the pairs of plates 45 and 46 in two vertically spaced rows as shown in FIGS. 3 through 5. The upper and lower pairs of rollers in the rows are spaced successively a decreasing distance toward the unit 40 to form a tapering wedge-like configuration formed by the several rollers and with the smaller end of the wedge facing the unit 40 and the wider end facing the unit 39. The number of rollers in the rows may be varied in some instances and the invention should not be restricted to the precise number of rollers illustrated in the drawings. In all cases, however, the assemblage of plural rollers will taper toward one end to produce the described roller wedge unit and the active peripheral faces of the rollers constituting the wedge unit will project above and below the edges of the plates 45, as shown in FIGS. 3 and 4.

The several plates 45 and 46 are held in assembled relationship by threaded rods 50 which extend entirely through the assembly, FIG. 5, and are provided at their end with nuts 51 outwardly of the plates 46. Spacer elements 52 surround these rods between the pairs of plates 45 and 46 and between the two plates 45 to prevent binding of the rollers 47 which should be free-turning and to maintain the proper spacing of the several plates and rollers which comprise the roller wedge unit.

The clamping device 37 further comprises a top pressure plate 53 having a hardened wear section or liner 54 on each side thereof adjacent the upper two rows of rollers 47 and a lower pressure plate 55 having similar liners 56 beneath the lower two rows of rollers 47, see FIG. 5. The top and bottom pressure plates 53 and 55 have central through openings receiving the clamping shaft 19 therethrough and thus are held against horizontal displacement caused by movement of the roller wedge device or unit under control of the cylinder-piston units 39 and 40. The pressure plates 53 and 55 can, however, shift relative to the shaft 19 vertically or along the axis thereof. The plates 53 and 55 are complementally tapered to coact with the roller wedge unit and the liners 54 and 56 are in tangential contact with the rollers 47 as clearly shown in FIGS. 3 and 4.

The bottom pressure plate 55 has a centering cavity 57 in its lower face receiving the top of hub 18 and also rests upon the top edges of the several web plates 17. The top pressure plate 53 bears against the bottom of a large threaded nut 58 on the upper threaded portion of clamping shaft 19 and this nut has sturdy turning handle means 59, as shown, so that the position of the nut 58 on the shaft 19 may be changed when desired.

Operation

The general mode of operation of the retreading mold is described in the aforesaid Mattox et al. patent and need not be repeated herein. However, the locking and unlocking of the clamping unit or head 14 is not accomplished by manual turning of the large nut 58, as in said patent, and this nut is utilized in the invention merely in a preliminary step prior to the final locking operation produced by the roller wedge means.

After the tire casing 60 has been introduced into the mold matrix 30, the power cylinder 26 is activated by the control means disclosed in said patent and the arm structure 20 is swung to the clamping position in FIG. 1. At this time, the nut 58 may be backed up somewhat on the shaft 19 and the upper handle 36 is utilized to manipulate the keys 35 of the shaft into coupling engagement with the bayonet slot means 34 of block 33. When this is accomplished, the nut 58 may be turned if necessary to bring it into contact with the top pressure plate 53, as shown in the drawings, but the nut need not be tightened manually as was necessary in the prior art to produce the final locking or clamping effect on the matrix.

Instead, at this time, the cylinder units 39 and 40 are activated in unison by conventional control valve means and one of the piston rods 43 is retracted while the other one is extended, FIGS. 3 and 4, so as to shift the roller wedge device in the desired direction. The proper direction of shifting for clamping or locking the unit 14 against the matrix is illustrated in FIG. 4, where the roller wedge device has been shifted to the left or toward the small end of the wedge, thus forcing the bottom pressure plate 55 downwardly against the hub 18 and web plates 17 of clamping unit 14. The top pressure plate 54 cannot move upwardly because of contact with the nut 58 and thus will resist the upward thrust caused by the movement of the roller wedge unit. The two plates 53 and 55, as shown in FIG. 5, are free of direct connection with the side plates 46 and therefore movable relative thereto under influence of the roller wedge device.

In order to release or unlock the clamping unit 14 preparatory to opening the mold apparatus and removing the tire, the roller wedge device is shifted in the opposite direction by the cylinder units 39 and 40, or to the right in FIG. 3, to relieve pressure on the two plates 53 and 55. Once this is done, the nut 58 is easy to turn and the handle 36 may be used to uncouple the shaft 19 from the block 33 enabling the power cylinder 26 to lift the entire clamping unit 14 from the mold matrix.

It should also be made clear that the roller wedge assembly has a clearance passage for the clamping shaft 19 between the plates 45 thereof and between the ends of piston rods 43, whereby the wedge may be shifted forwardly and rearwardly without interference with the shaft 19. This is clear from an inspection of FIGS. 3 and 4.

In light of the above description, it is believed that the advantages and economies present in the invention locking means will be apparent to those skilled in the art.

It is to be understood that the form of the invention herewith shown and described is to be taken as a preferred example of the same and that various changes in the shape, size and arrangement of parts may be re-

We claim:

1. In a tire retreading mold apparatus, a supporting stand, said stand adapted to support a full circle retreading mold matrix assembly in a substantially horizontal position, a movable clamping unit above the stand and shiftable to active and inactive positions relative to the stand and a mold matrix assembly on the stand, the stand having a coupling part, a turnable and axially slidable clamping shaft on the clamping unit adapted for coupling engagement with said coupling part of the stand when the coupling unit is moved to said active position relative to the stand, an adjustable abutment element on the clamping shaft movable lengthwise thereof, and a power operated movable wedge locking device on the clamping unit operable substantially at right angles to the axis of said shaft and including a first element engaging said abutment element of the shaft and a second element movable relative to the shaft along the axis thereof and bearing upon the clamping unit.

2. The structure of claim 1, wherein said wedge locking device includes a tapering wedge unit, pressure plates on opposite sides of the wedge unit, one pressure plate engaging said abutment element and the other pressure plate engaging the clamping unit, each pressure plate having an opening receiving the clamping shaft, and a power unit coupled to the wedge unit to shift the same in opposite directions.

3. The structure of claim 2, wherein the tapering wedge unit includes opposed wedging faces formed by rollers whose peripheries are tangent to planes coincident with the wedging faces.

4. The structure of claim 2, wherein said power unit comprises at least one fluid pressure operated cylinder piston actuator on the clamping unit substantially at right angles to the clamping shaft and coupled to the tapering wedge unit, the clamping shaft passing through the wedge unit and the wedge unit including a clearance space for said shaft so that the wedge unit may move transversely of the axis of said shaft.

5. The structure of claim 2, wherein said power unit coupled to the wedge unit is an opposed pair of fluid pressure operated cylinder-piston actuators on the clamping unit coupled to opposite ends of the tapering wedge unit in opposed axial alignment and being operable in unison to move wedge unit transversely of the axis of the clamping shaft.

6. The structure of claim 3, wherein said rollers consist of top and bottom plural rows of rollers, axle elements carrying the rollers for free rotation, plate supports for said axle elements and interconnecting and spacing means for the plate supports, said pressure plates free of attachment to the plate supports.

7. The structure of claim 6, and liner inserts on said pressure plates adjacent to said rows of rollers and contacting the peripheries of the rollers and directly receiving the pressure caused by movement of the tapering wedge unit.

8. In a tire retreading mold apparatus, a floor stand including a horizontal table portion adapted to support a retreading mold matrix with the latter lying on its side, an overhead mold matrix clamping unit including power means to shift said unit between active clamping and inactive remote positions, a clamping shaft carried by the clamping unit and having a lower end coupling part for coupling engagement with a coacting coupling part on said stand, an adjustable clamping nut on said shaft near the top of the clamping unit, a tapered wedge locking device on said unit below said nut including a top pressure plate abutting the nut, a lower pressure plate abutting a surface of the unit and an intermediate wedge between said pressure plates, said pressure plates having opening means receiving the shaft and being restrained by the shaft from movement transversely thereof but being movable axially of the shaft, said wedge movable transversely of the shaft, and power means on the clamping unit coupled to the movable wedge to move the same in opposite directions transversely of the shaft while the shaft is coupled to the stand.

9. The structure of claim 8, wherein said wedge includes a body portion and rollers freely journaled on the body portion in upper and lower groups, the peripheries of said groups tangent to converging wedge planes and said pressure plates having converging wedge faces engaging the roller peripheries.

10. The structure of claim 8, wherein the power means comprises at least one extensible and retractable cylinder-piston unit attached to the movable wedge and to a part of the clamping unit.

11. A tire retreading mold apparatus comprising in combination a floor stand having a table portion adapted to support a full circle retreading mold matrix with the latter resting on one side, a cooperating overhead mold matrix clamping unit and power means to raise and lower said unit, a movable part on said unit adapted for coupling to a mating part on said stand when the clamping unit is lowered to an active clamping position, and a power operated locking wedge mechanism bodily carried by the clamping unit and effective in one position to force said unit into tight clamping engagement with the mold matrix positioned between said unit and said stand.

References Cited

UNITED STATES PATENTS 3,240,653  3/1966  Mattox et al.
3,438,090  4/1969  Dennis.

J. HOWARD FLINT, JR., Primary Examiner

U.S. Cl. X.R.
18—2, 43